United States Patent [19]
Demaray

[11] Patent Number: 6,036,421
[45] Date of Patent: Mar. 14, 2000

[54] FASTENING DEVICE WITH DETACHABLE EXTENSION

[75] Inventor: Eric Paul Demaray, Daytona Beach, Fla.

[73] Assignee: Joe S. Hecker, Clayton, Mo.

[21] Appl. No.: 09/236,117

[22] Filed: Jan. 22, 1999

Related U.S. Application Data

[63] Continuation-in-part of application No. 09/092,926, Jun. 5, 1998, and a continuation-in-part of application No. 08/903,645, Jul. 31, 1997.

[51] Int. Cl.⁷ .............................. F16B 37/08; F16B 43/00
[52] U.S. Cl. ...................... 411/432; 411/169; 411/533; 411/973; 411/999
[58] Field of Search .................. 411/2, 3, 5, 169, 411/427, 435, 432, 973, 533, 999

[56] References Cited

U.S. PATENT DOCUMENTS

| | | |
|---|---|---|
| 133,694 | 12/1872 | Bishop . |
| 1,058,139 | 4/1913 | Bartley . |
| 1,498,686 | 6/1924 | Farnsworth . |
| 1,538,559 | 5/1925 | Johnson . |
| 3,425,473 | 2/1969 | Knowlton . |
| 3,460,428 | 8/1969 | Charles ........................................ 411/2 |
| 3,937,121 | 2/1976 | Schubert . |
| 4,164,164 | 8/1979 | Trungold . |
| 4,194,806 | 3/1980 | Macemon ................................ 411/2 X |
| 4,820,096 | 4/1989 | Knight .................. 411/435 X |
| 4,838,746 | 6/1989 | Giannuzzi . |
| 4,883,398 | 11/1989 | Duncan . |
| 5,492,360 | 2/1996 | Logeman . |

FOREIGN PATENT DOCUMENTS

| | | | |
|---|---|---|---|
| 2718562 | 11/1978 | Germany ............................... | 411/435 |

*Primary Examiner*—Neill Wilson
*Attorney, Agent, or Firm*—Holland & Knight LLP; David G. Maire

[57] ABSTRACT

A fastening device to be installed in areas having limited access. A washer is formed with an integral extension, and a nut is bonded to the washer. The device is installed onto a fastener by manipulating the extension. After the nut is tightened onto the fastener, the extension is detached from the washer by being bent along a score is formed between the extension and the washer.

18 Claims, 3 Drawing Sheets

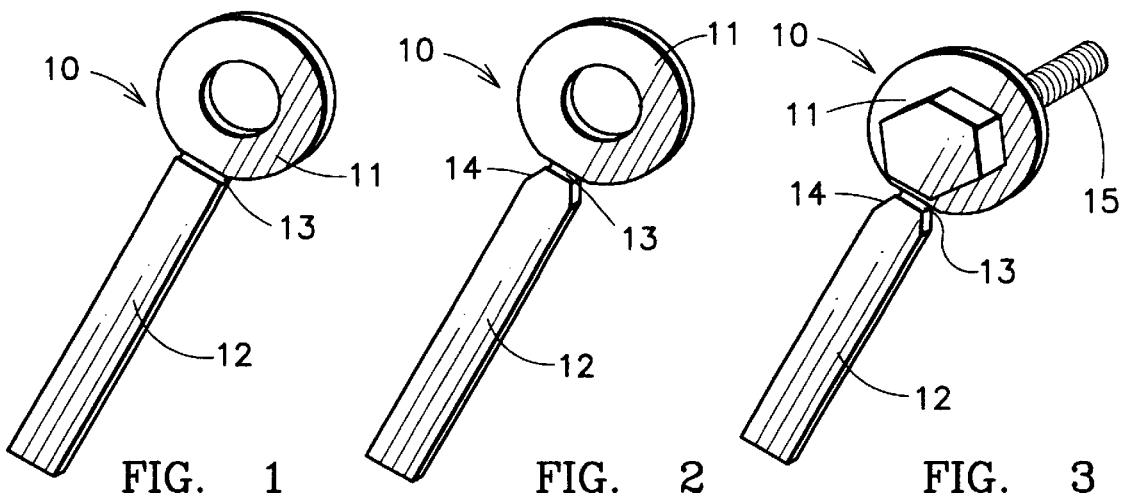
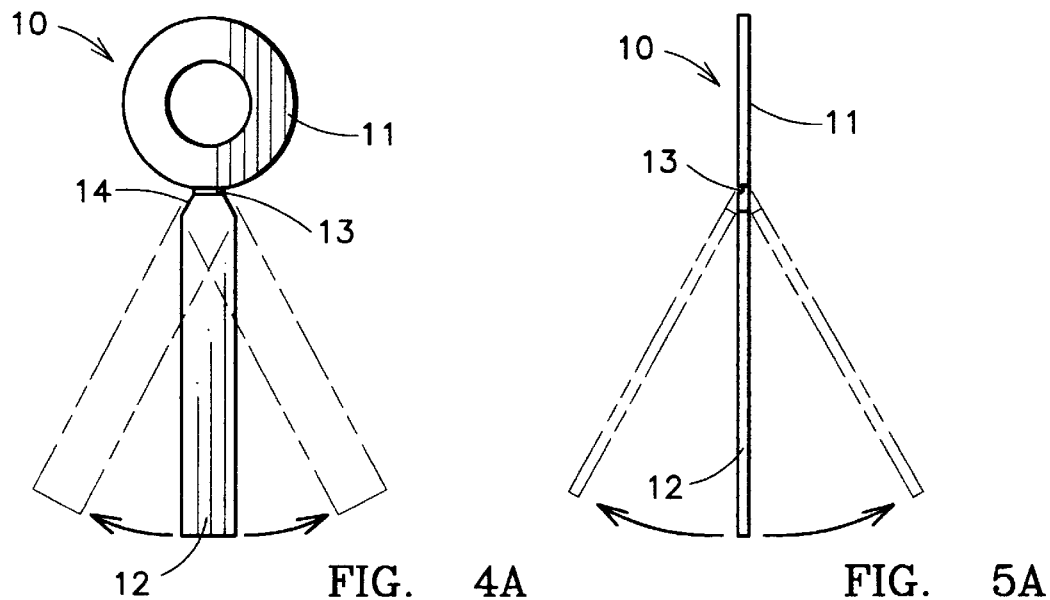
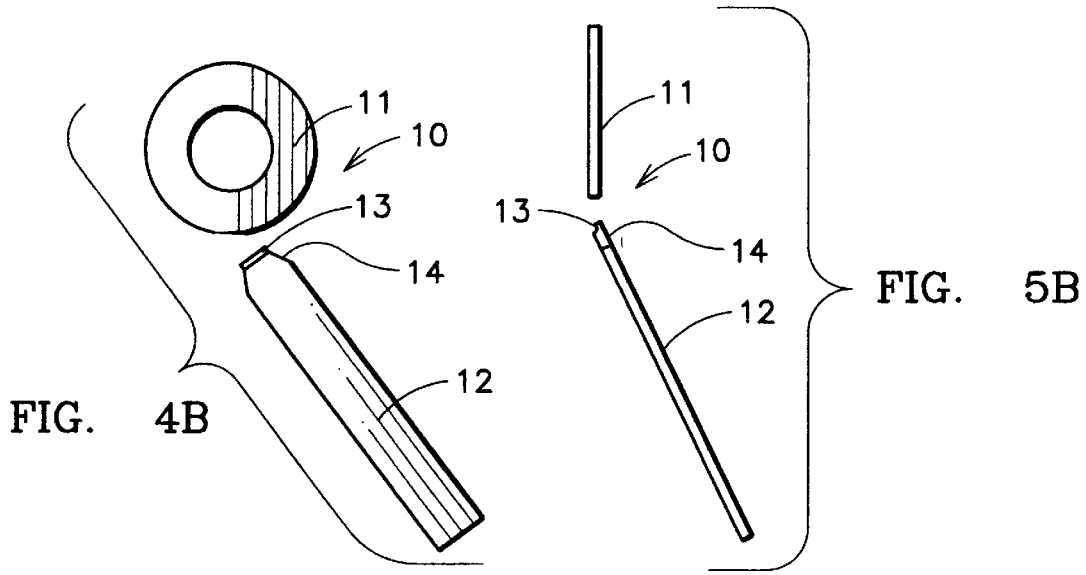

FASTENING DEVICE WITH DETACHABLE EXTENSION

This application is a continuation in part of co-pending application Ser. No. 09/092926 filed Jun. 5, 1998, and of co-pending application Ser. No. 08/903,645, filed on Jul. 31, 1997.

FIELD OF THE INVENTION

This invention relates generally to the field of building and construction materials and methods, and more specifically to the field of washers and nuts and the installation thereof.

BACKGROUND OF THE INVENTION

Bolts, nuts and washers are commonly utilized to join building materials. A washer may be inserted between a nut and the work piece to ensure tightness, and to prevent leakage, or to relieve friction between the bolt or nut and the work piece. Often times the washer and nut must be inserted onto a bolt, stud or screw in a work location which has a limited amount of space or a limited access. The nut and/or washer may be awkward to handle due to its size, shape or other physical limitation of the work area or workman.

Accordingly, it is an object of the present invention to provide a washer and a nut that are easy to handle and to install, and to provide a method of manufacturing such a washer and nut. It is a further object of this invention to provide a method of installing a washer and a nut that can be utilized in work areas having limited access or limited space.

SUMMARY

In order to achieve these and other objects of the invention, a device is provided consisting of a washer; a means for holding attached to the washer; a means for detaching the means for holding from the washer, the means for detaching located intermediate the washer and the means for holding; and a nut adhered to the washer. A method of installing a washer and nut is provided having the steps of: providing a washer having a nut bonded thereto and having a means for holding attached thereto and having a means for detaching the washer from the means for holding; installing the nut and washer onto a fastener by manipulating the means for holding; utilizing the means for detaching to remove the means for holding from the washer. A method of manufacturing is provided having the steps of: forming a washer; forming a means for holding attached to the washer; forming a means for detaching the washer from the means for holding intermediate the washer and the means for holding; providing a nut; applying an adhesive to at least one of the nut and the washer; pressing the nut and the washer together; allowing the adhesive to harden, thereby joining the washer to the nut.

BRIEF DESCRIPTION OF THE DRAWINGS

FIG. 1 is a perspective view of a device built in accordance with this invention.

FIG. 2 is a perspective view of an alternative embodiment of a device built in accordance with this invention.

FIG. 3 is a perspective view of the device of FIG. 2 installed on a fastener.

FIGS. 4A and 4B are top views of the device of FIG. 2 with the extension being removed.

FIGS. 5A and 5B are side views of the device of FIG. 2 with the extension being removed.

DESCRIPTION OF THE PREFERRED EMBODIMENTS

Figure 6:
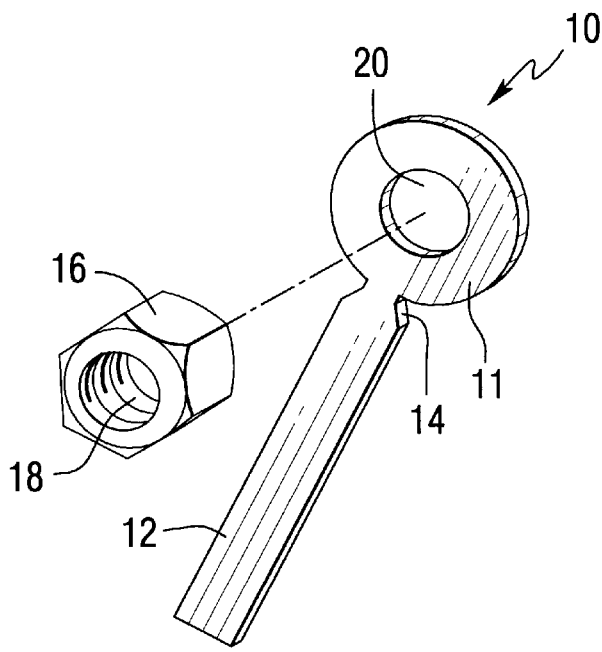
FIG. 6 is a perspective view of a nut and the device of FIG. 2.

FIG. 1 illustrates a device 10 including a washer 11 and an extension 12 detachably secured to the washer 11. The term washer as used herein is not limited to the embodiment illustrated in FIG. 1. FIGS. 1–5B illustrate a circular washer 11 having an opening through which a bolt, screw, or other fastener 15 may be inserted, as shown in FIG. 3. The term washer as used herein includes a variety of sizes, shapes and materials; for example square washers, lock washers, star washers, split washers, etc. Washer 11 may be formed of aluminum, steel, stainless steel, coated steel, spring steel, copper, rubber, resin, or other material known in the art to be used to form a washer. Washer 11 may be sized to fit any predetermined fastener, for example ANSI standard sizes such as a #8, or dimensional sizes such as ¼ inch, etc. The term washer as used herein may also include a device with no opening formed therein, such as a shim having either a flat configuration or a tapered thickness.

Washer 11 and extension 12 may be two separate pieces of material or they may be formed from a single piece of material. If they are two separate pieces of material, they may be joined by any known materials joining process, such as gluing, bonding, brazing, welding, soldering, etc. Extension 12 may be a wire or a generally flat piece of material as shown in the Figures. Washer 11 and extension 12 may be stamped from a single piece of material, such as from a strip of sheet metal so that extension 12 is integrally attached to the washer 11. In such an embodiment, the extension 11 will have the same thickness as the washer 11, will be coplanar with the washer 11, and will be integrally attached to an edge of the washer 11. For example, a device 10 sized to fit a #10 fastener may be formed from sheet metal having a thickness of 25 mils, or to fit a ¼ inch fastener made from sheet metal having a thickness of 32 mils.

A score 13 is formed in the material intermediate the extension 12 and the washer 11. The score 13 is a means for removing the extension 12 from the washer 11. The score 13 may extend across the width of the extension 12 in a direction tangential to an edge of the washer 11.

Figure 10:
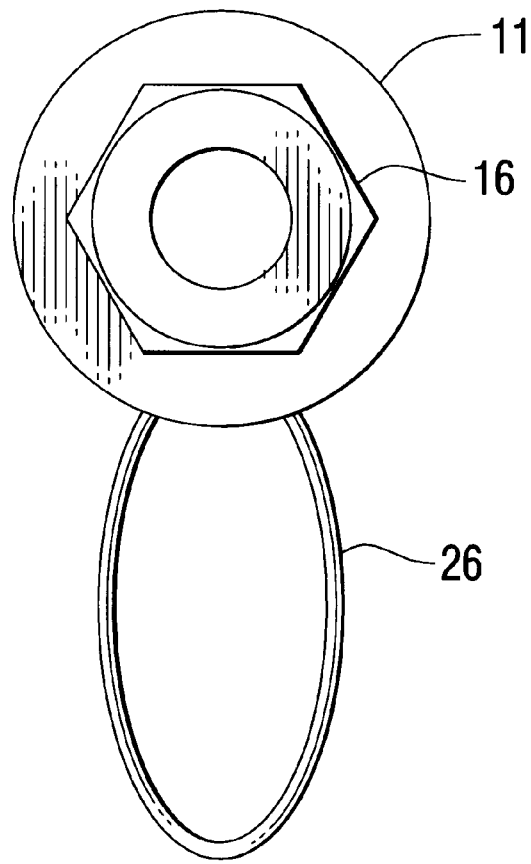
FIG. 10 is a top view of a device in accordance with this invention having a wire loop attached to a washer.

In use, the extension 12 is a means for holding the washer. The extension 12 is illustrated in FIGS. 1–5B as being a flat handle having a generally rectangular shape. A means for holding the washer is not limited to the shape illustrated in FIGS. 1–5B, and may include, for example, extensions formed in the shape of a triangle, square, curvilinear forms, rectangles of a variety of proportions, a wire or wire loop, 26 as shown in FIG. 10 etc. The means for holding the washer extends away from the washer a distance sufficient to facilitate holding the extension 12 by hand and manipulating it to install the washer. The washer 11 may be manipulated to place it around a fastener 15, or if the washer 11 is being used as a shim, to place it between mating surfaces in hard to reach configurations. The extension 15 may also be manipulated lateral to the washer 11 or side-to-side or both to bend the material proximate the score 13, as illustrated in FIGS. 4A or 5A. The fastener 15 is driven to a firm position on a work piece (not shown) thereby securing the washer 11 between the fastener 15 and the work piece. Such bending will work harden the material, causing it to fail mechanically, thereby permitting the extension 12 to be removed from the washer 11, as shown in FIGS. 4B and 5B.

A second embodiment of device 10 is illustrated in FIG. 2. A notch 14 is formed at each end of the score 13 intermediate the extension 12 and the washer 11, so that the width of the extension 12 tapers inward at its end proximate the washer 11. Notch 14 is also a means for removing the extension 12 from the washer 11. The notch 14 serves as a stress riser in a manner similar to the score 13 so that when the extension 12 is bent relative to the washer 11 the material will fail and the extension 12 can be detached from the washer 11. This embodiment may be used in areas that are difficult to reach, for instance where the extension is difficult to bend laterally in the direction shown in FIG. 5A. After a fastener 15 is secured in position through the washer 11, the extension 12 may be bent side-to-side toward the notches 14 as shown in FIG. 4A. This may break the extension 12 from the washer 11 or weaken the score 13 sufficiently so that the extension 12 may be removed by bending it slightly in the direction shown in FIG. 5A.

If the washer 11 and extension 12 are two separate pieces of material, the means for removing the extension 12 from the washer 11 may be the bonding material used to join the two parts. A bonding process/material, for example a weld, braze or solder joint or glue, may be selected to provide sufficient joint strength for shipping and installation of the washer 11, but may be designed for mechanical failure upon the application of a repeated bending force after installation.

Figure 7:
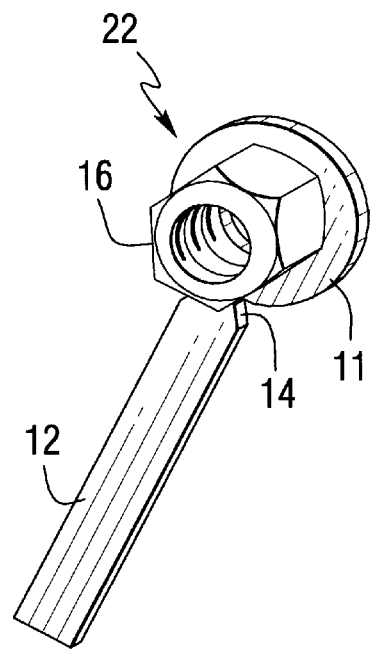
FIG. 7 is a device built in accordance with this invention.

FIG. 6 illustrates the device 10 described above along with a nut 16. Nut 16 contains a central opening 18 having threads formed therein. By attaching nut 16 to device 10 with the threaded opening 18 of nut 16 aligned with the hole 20 formed in washer 11, a device 22 as shown in FIG. 7 is formed. Alternatively, washer 11 may be attached to nut 16 and a means for handling the washer 11 and nut 16 may be attached to nut 16. Alternatively, a means for handling may be attached to nut 16 without having a washer attached.

Nut 16 may be any type or size known in the art. Nut 16 may be formed from a variety of materials such as, for example, steel, zinc-coated steel, aluminum, etc. Nut 16 may have locking features, such as a nylon insert around the threads or a castle design for use with a Carter pin (not shown) inserted through a hole in the fastener. The thread pitch of nut 16 may be coarse, for example 24 threads per inch, or fine, for example 32 threads per inch, depending upon the fastener it is designed to interface with.

Figure 8:
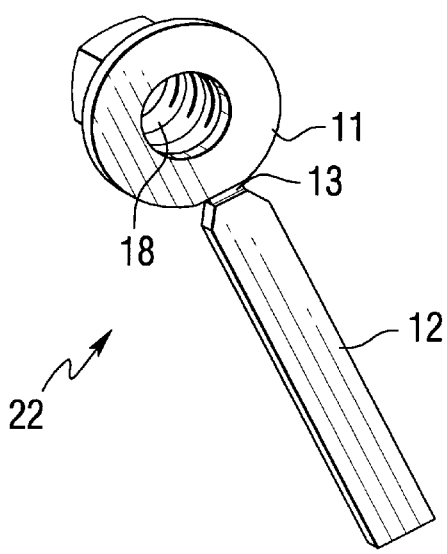
FIG. 8 is a bottom view of the device of FIG. 7.
Figure 9:
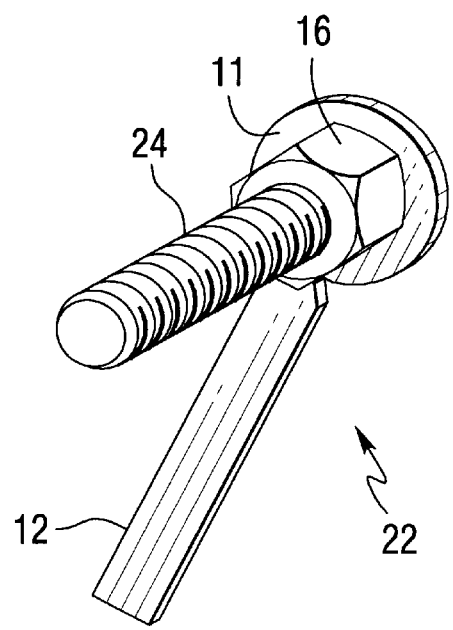
FIG. 9 is the device of FIG. 7 installed on a fastener.
Figure 11:
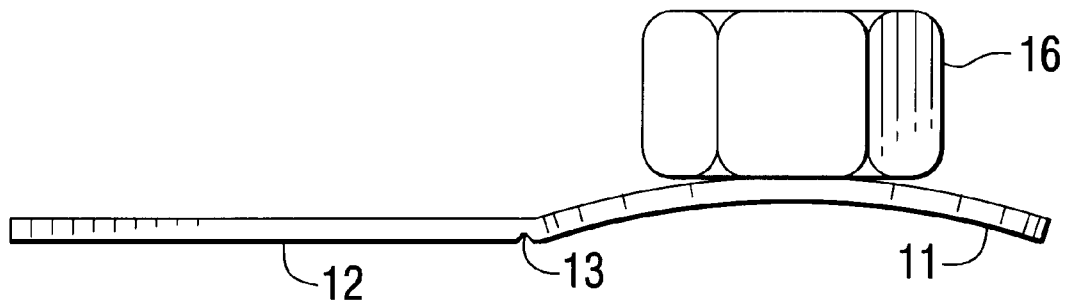
FIG. 11 is a device in accordance with this invention having a nut attached to a convex side of a washer.

Device 22 of FIG. 7 may be formed with standard manufacturing techniques. In one embodiment washer 11 and extension 12 are stamped from a strip of sheet metal. Notches 14 and hole 20 may also be formed during the stamping process. A score 13, shown in FIG. 8 which is a bottom view of device 22, is formed intermediate the washer 11 and extension 12 as a means for detaching the washer 11 from the extension 12. Nut 16 may be bonded to the washer 11 by applying an adhesive to either the nut 16 or the washer 11 or both, pressing the nut 16 and washer 11 together, and allowing the adhesive to harden. The nut/washer combination may be swedge together as is known in the art. In one embodiment washer 11 has one surface that is slightly convex and one surface that is slightly concave. Advantageously, such a curved shape of the washer 11 will provide a springing force that acts as a locking device to help prevent the nut 16 from becoming loose after being tightened onto a fastener 24, as shown in FIG. 9. Nut 16 may be attached to any surface of the washer 11 and preferably to the convex side. If device 22 is formed to include a score 13, the nut 16 is preferably adhered to the washer 11 on a side as shown in FIG. 11 of the washer opposed the score 13, as shown in FIG. 8.

The adhesive used to bond the nut 16 to the washer 11 may be selected to have predetermined properties, such as drying/curing time, viscosity, strength, and chemical compatibility. Advantageously, a fast drying/curing adhesive is used to speed the assembly of device 22. Glue that cures to become a hard material may be preferred over one that drys to a semi-hard or soft consistency. The adhesive may be applied as one or more drops to a top surface of a nut 16 laying in a horizontal position. The washer 11 may then be positioned to be concentric with the nut 16 and pressed onto the nut 16, thereby spreading the adhesive between the two mating surfaces. The viscosity of the adhesive is preferably selected to be sufficiently low to prevent the drops of adhesive from running off of the nut surface, and sufficiently high to allow it to spread between the mating surfaces during the step of pressing the parts together. The strength of the glue should be sufficient to keep the parts together during shipment and manipulation of the device 22. Preferably the bond between the nut 16 and washer 11 will break when the nut is tightened onto a fastener 24, thereby allowing the parts to rotate in relation to one another. One adhesive used successfully for this application is a cyanoacrylate glue. For small devices 22a single drop of glue may be sufficient, while for larger devices 22 two or three drops may be required. The adhesive should be applied in a quantity that avoids the flow of adhesive into the threads formed in the nut 16. It may be beneficial to inspect the joined washer 11 and nut 16 to confirm the absence of adhesive in the threads. Preferably, the quantity of adhesive applied is sufficiently small that there exists direct contact between at least a portion of the mating surfaces of the nut 16 and washer 11. Such direct contact will ensure that the nut does not loosen over the long term due to creep or degradation of adhesive between the nut 16 and washer 11.

Devise 22 may be installed onto a fastener 24 by manipulating the extension 12 to engage the threads in nut 16 with the mating threads on fastener 24. If fastener 24 is a bolt or screw extending through a work piece, device 22 may be installed by tightening the nut 16 onto the fastener 24 by turning the head (not shown) of the fastener 24 while holding the extension 12 stationary. If fastener 24 is a stud, the nut 16 may be started onto the threads of fastener 24 by manipulating the extension 12 to the extent permitted by available work space, and then further tightening the nut 16 with a wrench. Tightening of the nut 16 onto the fastener 24 may preferably break the bond between the washer 11 and nut 16. Extension 12 may then be removed by bending the extension 12 along the score 13 or notches 14 as described above.

Other aspects, objects and advantages of this invention may be obtained by studying the Figures, the disclosure, and the appended claims.

I claim as my invention:

1. A device comprising:
    a washer;
    a means for holding attached to said washer;
    a means for detaching said means for holding from said washer, said means for detaching located intermediate said washer and said means for holding;
    a nut attached to said washer;
    wherein said washer and said means for holding are formed from a single piece of material, and wherein said means for detaching comprises a score formed in said material intermediate said washer and said means for holding.

2. The device of claim 1, wherein said nut is attached to said washer on a side of said material opposed said score.

3. A device comprising:
   a washer;
   a means for holding attached to said washer;
   a means for detaching said means for holding from said washer, said means for detaching located intermediate said washer and said means for holding;
   a nut attached to said washer;
   wherein said washer and said means for holding are formed from a single piece of material, and wherein said means for detaching comprises a notch formed in said material intermediate said washer and said means for holding.

4. A device comprising:
   a washer;
   a means for holding attached to said washer;
   a means for detaching said means for holding from said washer, said means for detaching located intermediate said washer and said means for holding;
   a nut attached to said washer;
   wherein said nut is adhered to said washer by glue.

5. A device comprising:
   a washer;
   a means for holding attached to said washer;
   a means for detaching said means for holding from said washer, said means for detaching located intermediate said washer and said means for holding;
   a nut attached to said washer;
   wherein said washer comprises a concave side and a convex side, and wherein said nut is attached to said washer on said convex side.

6. A device comprising:
   a washer;
   a means for holding attached to said washer;
   a means for detaching said means for holding from said washer, said means for detaching located intermediate said washer and said means for holding;
   a nut attached to said washer;
   wherein said nut is adhered to said washer by an adhesive, and further comprising said washer and said nut being in direct contact along at least a portion of their adhered surfaces.

7. A device comprising:
   a washer;
   a means for holding attached to said washer;
   a means for detaching said means for holding from said washer, said means for detaching located intermediate said washer and said means for holding;
   a nut attached to said washer;
   wherein said means for holding comprises a wire.

8. A device comprising:
   a washer;
   a means for holding attached to said washer;
   a means for detaching said means for holding from said washer, said means for detaching located intermediate said washer and said means for holding;
   a nut attached to said washer;
   wherein said means for holding comprises a flat handle.

9. A device comprising:
   a washer;
   a means for holding attached to said washer;
   a means for detaching said means for holding from said washer, said means for detaching located intermediate said washer and said means for holding;
   a nut attached to said washer;
   wherein said nut is attached to said washer by a swedge connection.

10. The device of claim 9, wherein said means for holding comprises a wire.

11. A method of installing a washer and nut comprising the steps of:
    providing a washer attached to a nut, and having a means for holding the washer and nut attached to one of said washer and nut, and having a means for detaching said means for holding from said washer and nut;
    installing said nut and washer onto a fastener by manipulating said means for holding;
    utilizing said means for detaching to remove said means for holding from said washer and nut,
    further comprising the step of tightening said nut onto said fastener, thereby breaking the attachment between said washer and said nut.

12. The method of claim 11, wherein said washer and said means for holding are formed from a single piece of material, and further comprising:
    forming said means for detaching by forming a score in said material intermediate said washer and said means for holding; and wherein
    the step of utilizing said means for detaching further comprises bending said material along said score.

13. The method of claim 11, wherein said washer and said means for holding are formed from a single piece of material, and further comprising:
    forming said means for detaching by forming a notch in said material intermediate said washer and said means for holding; and wherein
    the step of utilizing said means for detaching further comprises bending said material proximate said notch.

14. The method of claim 11, wherein the step of installing further comprises tightening said nut onto said fastener by turning said fastener while holding said means for holding stationary.

15. A method of manufacturing comprising the steps of:
    forming a washer;
    forming a means for holding attached to said washer;
    forming a means for detaching said washer from said means for holding intermediate said washer and said means for holding;
    providing a nut;
    applying an adhesive to at least one of said nut and said washer;
    pressing said nut and said washer together;
    allowing said adhesive to harden, thereby joining said washer to said nut.

16. The method of claim 15, wherein said washer and said means for holding are formed from a single piece of material, and wherein the step of forming a means for detaching comprises forming a score in said material intermediate said washer and said means for holding.

17. The method of claim 16, wherein said nut and said washer are joined on a side of said washer opposite said score.

18. The method of claim 15, further comprising the steps of:
    applying said adhesive in a quantity that avoids the flow of adhesive into threads formed in said nut;
    inspecting the joined washer and nut to confirm the absence of adhesive in said threads.

* * * * *